United States Patent
Tanguay et al.

(10) Patent No.: US 6,288,638 B1
(45) Date of Patent: Sep. 11, 2001

(54) HEAT DETECTOR HAVING AN INCREASED ACCURACY ALARM TEMPERATURE THRESHOLD AND IMPROVED LOW TEMPERATURE TESTING CAPABILITIES

(76) Inventors: William P. Tanguay, 5730 Dearborn Pkwy., Downers Grove, IL (US) 60516; Keith Corsello, 532 Cambridge Ave., Elburn, IL (US) 60119

( * ) Notice: Subject to any disclaimer, the term of this patent is extended or adjusted under 35 U.S.C. 154(b) by 0 days.

(21) Appl. No.: 09/552,380

(22) Filed: Apr. 19, 2000

Related U.S. Application Data

(60) Provisional application No. 60/132,834, filed on May 6, 1999.

(51) Int. Cl.[7] .................................................. G08B 29/00
(52) U.S. Cl. ...................... 340/514; 340/511; 340/515; 340/577; 340/578; 340/584; 340/587
(58) Field of Search .................................. 340/511, 514, 340/515, 577, 578, 584, 587

(56) References Cited

U.S. PATENT DOCUMENTS

| | | | |
|---|---|---|---|
| 3,882,477 | * 5/1975 | Mueller | 340/531 |
| 4,246,572 | 1/1981 | Larsen | 340/501 |
| 4,595,914 | 6/1986 | Siegel | 340/515 |
| 4,972,181 | 11/1990 | Fiene | 340/636 |
| 5,121,101 | 6/1992 | Jakubowski et al. | 340/515 |
| 5,198,801 | 3/1993 | Duggan et al. | 340/589 |
| 5,254,975 | 10/1993 | Torikoshi | 340/589 |
| 5,448,224 | 9/1995 | Mochizuki | 340/589 |
| 5,450,066 | 9/1995 | Brighenti et al. | 340/589 |
| 5,539,381 | 7/1996 | Johnson | 340/584 |
| 5,574,434 | 11/1996 | Liu | 340/534 |

FOREIGN PATENT DOCUMENTS 1096278   12/1967   (GB).

* cited by examiner

*Primary Examiner*—Daryl C. Pope

(57) ABSTRACT

A heat detector that includes a temperature sensing and testing circuit that provides an increased accuracy temperature sensing range and a push-to-test circuit that is electronically functional at low ambient temperatures. The heat detector includes a sensing circuit consisting of a voltage divider formed from a supply resistor and a thermistor. The thermistor is connected directly between a detector voltage input to a control unit and ground. The push-to-test circuit includes a parallel combination of a test resistor and a transistor each connected between the supply resistor and a voltage source. During normal operating conditions, base current is supplied to the transistor such that the transistor functions as a short circuit connection between the supply resistor and the voltage source. Upon depression of a push button, the base of the transistor is connected to the emitter such that the transistor acts as an open circuit. When the push button is depressed, a test resistor is connected in series with the supply resistor to simulate an increase in the ambient temperature to test the heat detector.

24 Claims, 5 Drawing Sheets

HEAT DETECTOR HAVING AN INCREASED ACCURACY ALARM TEMPERATURE THRESHOLD AND IMPROVED LOW TEMPERATURE TESTING CAPABILITIES

CROSS-REFERENCE TO RELATED APPLICATIONS

This application is based on and claims priority from provisional patent application no. 60/132,834 filed on May 6, 1999.

BACKGROUND OF THE INVENTION

The present invention generally relates to heat alarms. More specifically, the present invention relates to a heat alarm having improved alarm temperature threshold accuracy and an improved push-to-test, or alarm verification, feature that allows convenient and meaningful testing of the heat alarm at low temperatures.

Heat detectors, for many years, have been constructed using a mechanical temperature sensing element connected to a suitable switch. One technique used to implement such a heat detector utilizes a spring-loaded plunger that is held fast at normal room temperatures by a proprietary mixture of tin, lead and appropriate other elements. This material, similar to solder, melts at a preselected temperature and allows the spring to return to its relaxed state, which in turn causes a switch to close and operate a remote alarm panel or system. While this type of temperature sensing element works well at generating an alarm signal at the desired temperature, it has a useful life of only one actuation and must be replaced after such actuation.

A second type of heat detector in use is constructed using a bimetallic switch. These devices, often called "snap-action thermostats" offer multiple actuations during their lifetime. In this device, varying environmental temperatures cause a bi-metallic element to snap between two bi-stable positions, which in turn causes a switch to be opened or closed as a function of the bimetallic element.

A third type of heat detector that is in current use includes both a fixed temperature sensor and a rate-of-rise heat sensor. In this type of system, in addition to the spring-loaded switch actuator, the actual physical housing of the heat detector acts pneumatically upon the switch. Thus, when a relatively rapid change in temperature occurs, the expansion of the air within the housing causes an integral bellows to expand and actuate the same switch that is used for fixed temperature applications. Slow temperature or pressure changes, such as would be usual in changing environmental conditions, are essentially ignored by the use of a small air-bleed hole which allows the air pressure within the housing to slowly equalize and achieve equilibrium with the outside air pressure. This type of device can be actuated multiple times if the rate-of-rise function is activated, but can be actuated only one time if the fixed temperature feature is activated.

A fourth type of heat detector currently available includes a thermistor to sense the ambient temperature. The resistance of the thermistor changes as the ambient temperature increases and decreases. The varying thermistor is used in a voltage divider circuit as part of a classical Wheatstone bridge network to control the voltage applied to a pin of an integrated circuit. Currently, this type of alarm is offered in a fixed temperature model that generates an alarm when the ambient temperature exceeds a predetermined upper temperature limit, typically around 135° F. The system includes a push-to-test button that can be depressed to electronically test the alarm. The push-to-test button is not simply a button that activates the alarm, but instead electronically tests the operation of the circuit by inserting a component to electronically simulate an elevated temperature, while working in cooperation with the thermistor.

One problem that exists with the push-to-test system described above is that the push-to-test system may not operate when the ambient temperature is below around +20° F. (−7° C.). Below 20° F., the user must utilize an external heat source, such as a hair dryer, to increase the ambient temperature near the heat alarm's sensor. This will cause the heat alarm to emit an "alarm" signal if the sensor is heated above the normal alarm threshold and the alarm device is functioning properly.

Heat alarms are often found in attics, unheated garages, or crawl spaces of homes. In northern climates during the winter the temperature often falls below 20° F., and an actual "push-to-test" event on such a heat alarm may not cause an electrically valid response. This low temperature inoperability may be clearly stated in the user's manual for the product, but many times this user manual is not consulted or not immediately available to the actual user. This inoperability may cause the user to conclude that the heat alarm is not working properly, even though the alarm device may indeed be functioning correctly and the lack of a valid push-to-test response is instead due to the lack of functionality of the push-to-test circuit at low temperatures. The user must then augment the testing procedure with an external heat source to test the heat detector. Further compounding this situation is that some of these remote locations do not typically have convenient outlets wired for 120 volt AC, and utilizing conventional portable external heating sources, such as electric hair dryers, is often difficult.

Therefore, an object of the present invention is to provide a heat alarm that includes an improved testing circuit that allows the heat alarm to be meaningfully tested at substantially lower ambient temperatures. Further, it is an object of the present invention to provide a heat detector that has an improved accuracy alarm temperature threshold, which will subsequently allow the unit to respond to a plurality of specific temperature rate-of-rise parameters required by certain listing agencies. Further, it is an object of the present invention to provide a novel method to safeguard the user from shock hazards in the event of inadvertent contact with the thermistor temperature sensing component of the heat alarm device without detracting from the timely and accurate operation of the alarm device.

SUMMARY OF THE INVENTION

The present invention relates to a heat alarm that includes an improved accuracy alarm temperature threshold and at the same time permits the user to test the alarm at low temperatures. The temperature sensing circuit of the present invention includes a voltage divider generally consisting of a supply resistor in the upper leg of the voltage divider and a thermistor, whose resistance changes in response to temperature changes, in the lower leg of the voltage divider. As the value of the thermistor changes, a detector voltage between the upper and lower legs of the voltage divider is input to a control unit, which compares the detector voltage to a reference voltage. When the detector voltage falls below the reference voltage, the heat detector generates an alarm.

In accordance with the present invention, only the thermistor is included in the lower leg of the voltage divider and is connected directly between the voltage detector input of the control unit and ground. The use of only the thermistor in the lower leg of the voltage divider increases the accuracy of the alarm temperature threshold as compared to prior art circuits that include a linearizing resistance in series with the thermistor.

Because of the elimination of the linearizing resistance in series with the thermistor, the temperature sensing and testing circuit includes an improved push-to-test circuit for electronically testing the operation of the heat detector. The push-to-test circuit includes a parallel combination of a transistor and a test resistance in the upper leg of the voltage divider. Specifically, the parallel combination of the transistor and the test resistance are positioned between a voltage source and a supply resistance in the upper leg of the voltage divider.

During normal operation, the base of the transistor is supplied with base current through a bias resistance connected between the base of the transistor and ground. The supply of base current allows the transistor to be turned on and saturated such that the transistor generally acts a short circuit between the supply resistance and the voltage supply.

The push-to-test circuit includes a push button that, when depressed, directly connects the base of the transistor to the emitter. The direct connection between the transistor base and emitter inhibits base-emitter current (when the switch is closed), and causes an extremely high impedance between the transistor collector and emitter such that the transistor generally acts as an open circuit. With the transistor acting as an open circuit, the test resistance positioned in parallel with the transistor is inserted into the upper leg of the voltage divider in series between the voltage source and the supply resistance. The insertion of the test resistance into the upper leg of the voltage divider substantially reduces the detector voltage input to the control unit to test the operation of the heat detector. The value of the test resistance is selected such that the series combination of the test resistance and supply resistance allows the heat detector to be tested to a very low ambient temperature. The topology of the circuit design insures that, in the event of a thermistor that has open-circuited, the push-to-test circuit will not be able to cause the alarm to properly test, and the user will be appropriately notified that the heat alarm is not operating properly.

The thermistor of the present invention is encapsulated within a Kynar™ heat shrink tubing to prevent inadvertent electrical shock upon user contact with the thermistor, especially if a fault condition or incorrect wiring of the AC power to the heat alarm is present. The heat shrink sleeving electrically isolates the thermistor while allowing for the required sensitivity of the thermistor upon temperature changes.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
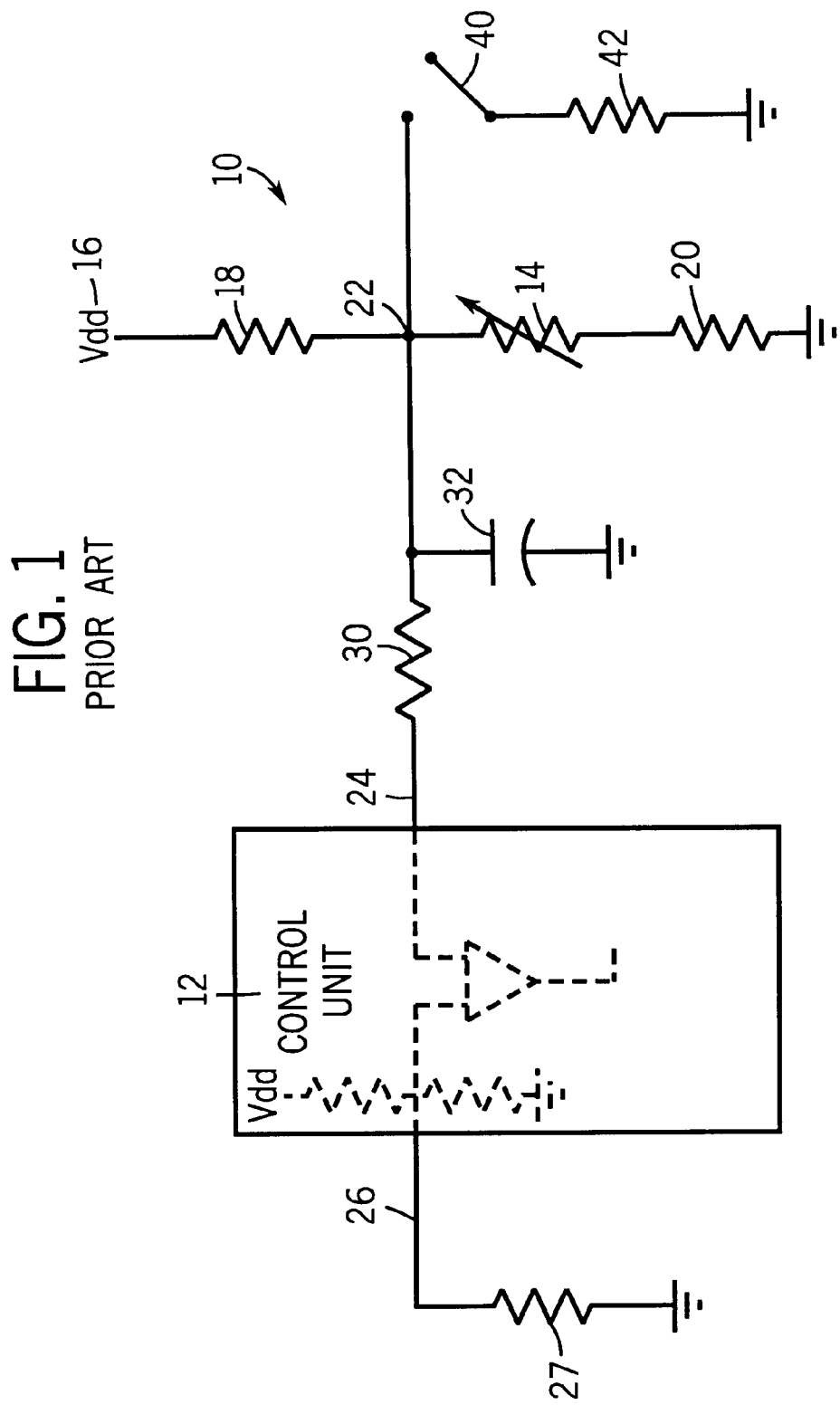
FIG. 1 is a schematic illustration of the push-to-test circuit and temperature sensing component utilized in a prior art heat detector.

Referring first to FIG. 1, thereshown is the temperature sensing and testing circuit 10 used in a prior art thermistor-based heat detector. In FIG. 1, only a portion of the entire heat detector circuit is illustrated to more precisely focus on the specific features of the present invention, since the remaining components connected to the control unit 12 are conventional and readily accessible to those of ordinary skill in the art.

In the circuit shown in FIG. 1, a thermistor 14 forms part of the lower leg of a voltage divider, while the upper leg of the voltage divider includes a supply resistance 18 connected to a voltage source 16. In the prior art circuit of FIG. 1, the thermistor 14 is connected to ground through a series resistance 20. As can be understood in FIG. 1, the thermistor 14 forms part of a Wheatstone Bridge configuration in which the lower leg of the bridge includes the series combination of the thermistor 14 and series resistance 20 to create a temperature-dependent detector voltage at node 22. In the embodiment of the prior art illustrated in FIG. 1, thermistor 14 is a negative temperature coefficient (NTC) device. Thus, as the ambient temperature increases, the value of the thermistor's resistance decreases. As the resistance of the thermistor 14 decreases, the detector voltage at node 22 also decreases.

The detector voltage at node 22 is applied to the detector input pin 24 of the control unit 12. A reference pin 26 of the control unit 12 is connected to an internal voltage reference circuit that, by itself, generally divides the voltage source in half, subject to the tolerances of the control unit 12. However, in the prior art circuit, an additional network of resistors, such as calibration resistor 27 in FIG. 1, is connected to reference pin 26 to slightly adjust the voltage at this node away from the nominal 50% point. Thus, the voltage seen at the reference pin 26 in the prior art device is approximately 48% of the voltage source 16. In the preferred embodiment of the invention, the voltage source 16 is a 9-volt supply.

During operation of the heat detector illustrated by the prior art embodiment of FIG. 1, the control unit 12 activates an alarm when the detector voltage at detector input pin 24 falls below the reference voltage at pin 26. Since both the detector voltage at the pin 24 and the reference voltage at pin 26 are based on the voltage source 16, the Wheatstone Bridge configuration inherently compensates for changes in the voltage source 16 such as, for example, if the voltage source 16 is a battery having a decreasing output.

The node 22 is connected to detector input pin 24 by a resistor 30 and a capacitor 32 that function to minimize inadvertent noise and transient influence to the control unit 12. In the embodiment of the invention illustrated, the resistor 30 is a 10 MΩ resistor and the capacitor 32 is a 0.01 μF capacitor such that the resistor 30 and the capacitor 32 have little to no effect on the value of the detector voltage applied to the detector input pin 24.

In the embodiment of the prior art illustrated in FIG. 1, the thermistor 14 has the following exemplar resistance characteristics over the temperature range of −30° C. to +80° C., as listed in Table 1.

TABLE 1

| Air Temperature Fahrenheit/(Centigrade) | Thermistor Resistance |
| --- | --- |
| −22° F./(−30° C.) | 34.64 M (megohm) |
| −4° F./(−20° C.) | 17.64 M |
| +14° F./(−10° C.) | 9.40 M |
| +32° F./(0° C.) | 5.36 M |
| +50° F./(+10° C.) | 3.042 M |
| +68° F./(+20° C.) | 1.814 M |
| +86° F./(+30° C.) | 1.067 M |
| +104° F./(+40° C.) | 673K (kilohm) |
| +122° F./(+50° C.) | 420K |
| +135° F./(+57.2° C.) | 307K |
| +140° F./(+60° C.) | 274K |
| +158° F./(+70° C.) | 182.8K |
| +176° F./(+80° C.) | 124.4K |

As can be understood in Table 1, the value of the thermistor 14 undergoes at least two orders of magnitude resistance change over the approximately 100° C. temperature change. In order to limit the total resistance change of the thermistor 14, the series resistance 20 is placed between the thermistor 14 and ground, which inherently serves to linearize the thermistor 14 transfer function. In the embodiment of the prior art illustrated in FIG. 1, the series resistor 20 has a value of approximately 1.0 MΩ.

Referring back to Table 1, the resistance of the thermistor 14 at the design temperature of 135° F. (57.2° C.) is approximately 307 kΩ. Thus, the value of the supply resistance 18 is selected such that the detector voltage at node 22 falls below the reference voltage at the reference pin 22 when the temperature reaches 135° F.

Figure 2:
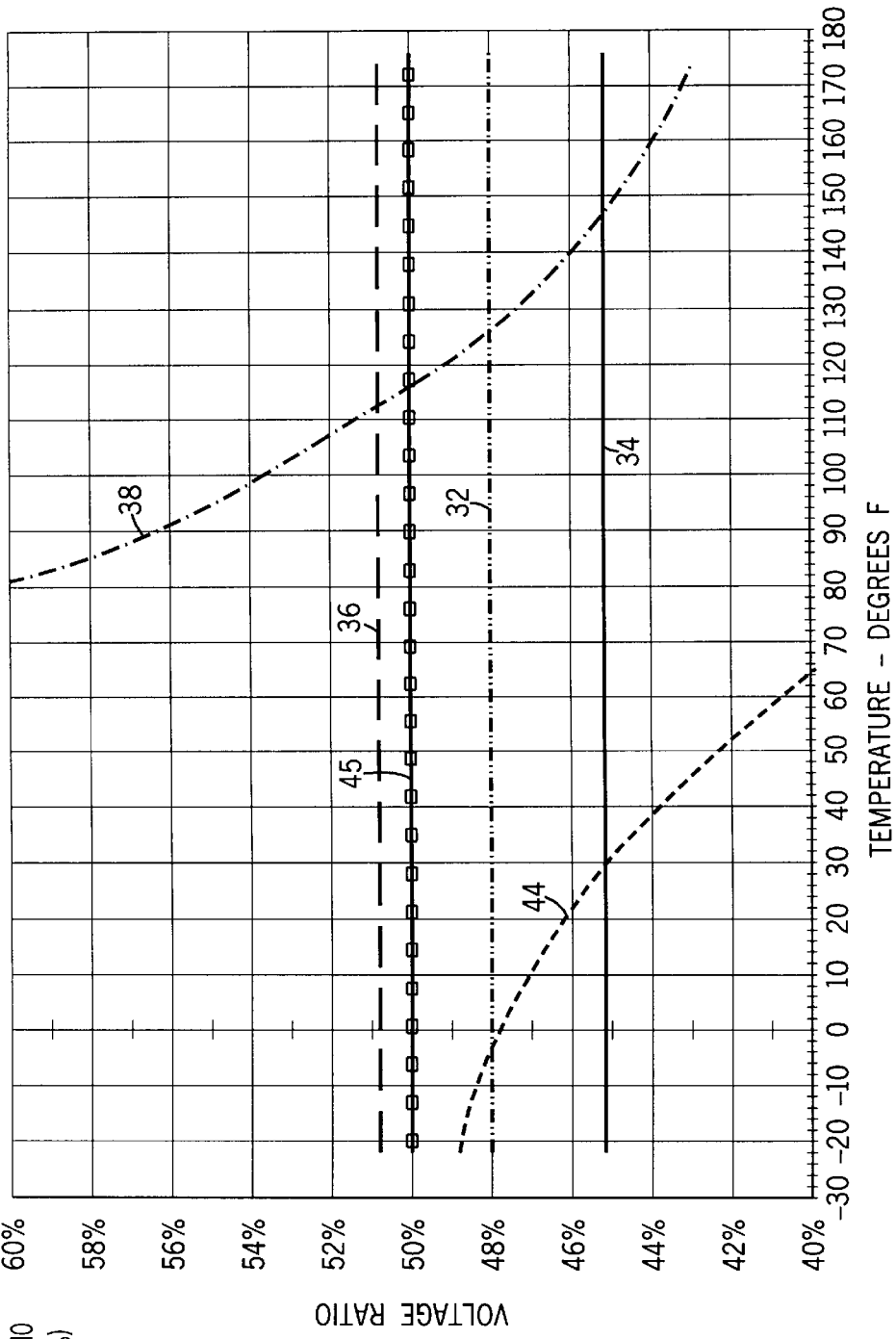
FIG. 2 is a graph illustrating the operational characteristics of the prior art heat detector illustrated in FIG. 1.

Referring now to FIG. 2, the nominal voltage for the reference pin 26 on the control unit 12 is illustrated by line 32. Line 32 is shown at approximately 48%, and assumes that the internal circuitry within the control unit 12, in cooperation with external calibration resistor 27, divides the voltage source 16 to this value. In actual practice, the reference voltage at pin 26 falls between a low limit 34 and a high limit 36 due to the manufacturer's tolerance of said control unit. For example, in the graph of FIG. 2, the low limit is approximately 45% while the upper limit 36 is approximately 51% of the supply voltage.

As can be seen in FIG. 2, a line 38 graphically illustrates the voltage ratio at node 22 as the value of the thermistor 14 changes as a result of the temperature increase. The voltage ratio 38 is determined by the voltage divider including the supply resistance 18 in the upper leg and the series combination of the thermistor 14 and series resistance 20 in the lower leg. The voltage ratio 38 crosses the high limit 36 of the reference voltage at pin 26 at approximately 112° F. and crosses the low limit 34 at approximately 148° F. Under ideal circumstances, the voltage ratio 38 intersects the nominal voltage 32 at a theoretical value of 126° F. Thus, the temperature at which the heat detector will signal the audible alarm depends greatly upon the tolerances of the control unit 12, and this tolerance sensitivity is exaggerated due to the relatively flat slope of the thermistor and resistor transfer function ratio 38 due primarily to the series resistance 20.

Referring back to FIG. 1, the electronic testing circuit for the thermistor 14 and control unit 12 includes a push button 40 connected to a test resistance 42, which in turn is connected to ground. The electronic method to simulate heat embodied by the push button 40 and test resistance 42 actually simulates an increase in temperature, rather than a gross functional test where a switch causes the horn to be sounded. The testing circuit of FIG. 1 simulates an increase in temperature significant enough to activate the alarm.

Specifically, when the push button 40 is closed, the test resistance 42 is connected in parallel with the series combination of the thermistor 14 and series resistance 22. Thus, the combined resistance seen in the lower leg of the voltage divider between node 22 and ground is the parallel combination set forth above. Listed below is a Table 2 illustrating the parallel combination of the resistances and the detector voltage value at node 22 for various ambient temperatures as found in the prior art unit.

TABLE 2

(assume Vdd = 9.0 volts for analysis purposes)

| Air Temperature ° F./(° C.) | Thermistor Resistance | Push-To-Test Output Voltages with Thermistor Nominal Voltage/Ratio Vdd | Push-To-Test Output Voltage with Thermistor Open Circuit Nominal Voltage/Ratio Vdd |
| --- | --- | --- | --- |
| −22° F./(−30° C.) | 34.64 M | 4.407/49.0% | 4.500/50.0% |
| −4° F./(−20° C.) | 17.64 M | 4.326/48.1% | 4.500/50.0% |
| +14° F./(−10° C.) | 9.40 M | 4.197/46.6% | 4.500/50.0% |
| +32° F./(0.0° C.) | 5.36 M | 4.025/44.7% | 4.500/50.0% |
| +50° F./(+10° C.) | 3.042 M | 3.796/42.2% | 4.500/50.0% |
| +68° F./(+20° C.) | 1.814 M | 3.553/39.5% | 4.500/50.0% |
| +86° F./(+30° C.) | 1.067 M | 3.302/36.7% | 4.500/50.0% |
| +104° F./(+40° C.) | 673K | 3.107/34.5% | 4.500/50.0% |
| +122° F./(+50° C.) | 420K | 2.945/32.7% | 4.500/50.0% |
| +135° F./(+57.2° C.) | 307K | 2.859/31.8% | 4.500/50.0% |
| +140° F./(+60° C.) | 274K | 2.833/31.5% | 4.500/50.0% |
| +158° F./(+70° C.) | 182.8K | 2.754/30.6% | 4.500/50.0% |
| +176° F./(+80° C.) | 124.4K | 2.699/30.0% | 4.500/50.0% |

As can be understood by the voltage values of Table 2 and observation of line 44 on FIG. 2, the voltage at node 22 equals the nominal reference voltage at node 26 only up to approximately −3° F. (−19° C.). However, analysis of the intersection of the high tolerance limit 36 shows that the push-to-test function would generally work at a very low temperature. The low tolerance limit 34 shows that the push-to-test function may work only as low as +29° F. (−2° C.). The actual level of operability of the prior art push-to-test function is quite variable due to the relatively flat slope of the push-to-test transfer function 44 at these low temperatures.

Although the value for the test resistance 42 could be modified to provide better low temperature characteristics, the test resistor 42 must be large enough such that the voltage at node 22 exceeds the maximum expected voltage at the reference pin 26 if the thermistor 14 breaks. The user should not get a valid push-to-test alarm condition if the thermistor is not functional. As illustrated in the far-right column of Table 2 and line 45 in FIG. 2, if the thermistor 14 breaks, the nominal 9 volt supply voltage 16 is divided in half (effectively 50%) in the prior art heat alarm, since the value of the test resistance 42 is selected to be approximately equal to the value of the supply resistance 18. In this manner, if the thermistor 14 is damaged, the prior art heat detector will not produce an alarm signal when the push button 40 is depressed.

If the series resistance 20 were removed from the voltage sensing and test circuit 10, the value of the supply resistor 18 could still be selected such that the heat detector would signal an alarm when the ambient temperature exceeded the predetermined maximum temperature. In this type of circuit, the heat detector would still respond to the resistance change of the thermistor 14, since the push button 40 would not cause the output of the node 22 to become equal to the voltage at the reference pin 26 until the push button 40 is actuated. However, the elimination of the series resistance 20 would make the push-to-test circuit completely ineffective at lower temperatures due to the drastic change in the thermistor resistance at these lower temperatures, as illustrated in Table 1. Specifically, the drastic change in the thermistor resistance at lower temperatures would quickly make the parallel combination of the thermistor 14 and the test resistor 42 too high to cause the voltage at node 22 to be reduced below the required trip voltage present at the reference pin 26.

As can be understood in FIGS. 1 and 2, the prior art heat detector utilizing the thermistor suffers several drawbacks, which include the relatively broad temperature variation in the trip point primarily due to the series resistance 20 and less significantly the integrated circuit tolerances, as well as a second drawback being the uncertainty of the heat detector to be "push-to-tested" accurately at low temperatures, generally below freezing.

In the prior art temperature sensing and testing circuit 10, two significant design problems were identified. The first problem is the relatively low numerical value of the slope of the resistor ratio 38 as a result of a series combination between the thermistor 14 and the series resistance 20 that causes the temperature trip point of the temperature sensing and testing circuit 10 to potentially have a wide variation. The second problem identified is the relative uncertainty for the temperature sensing and testing circuit 10 to function at low temperatures, such as the range beginning at and extending below +29° F. (−2° C.).

Figure 3:
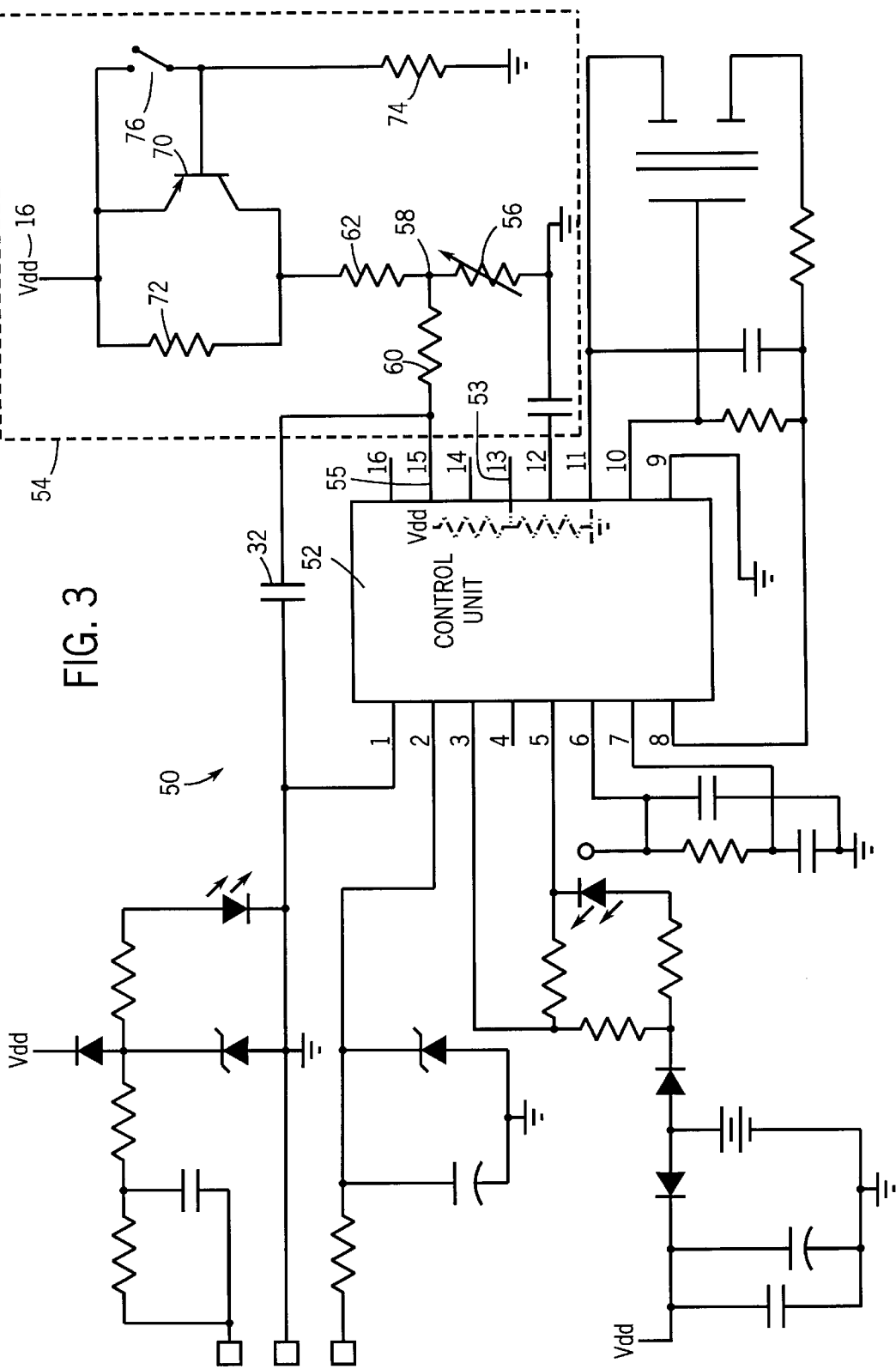
FIG. 3 is a circuit diagram illustrating the heat detector of the present invention incorporating the novel push-to-test electric circuit and temperature sensing component.

Referring now to FIG. 3, thereshown is a circuit diagram for an improved heat detector 50 constructed in accordance with the present invention. The heat detector 50 is centered around a control unit 52. In the preferred embodiment of the invention, the control unit 52 is an integrated circuit chip manufactured by Allegro and available as Part No. A5368CA, the pin numbers of which are included for illustrative purposes only. In the circuit diagram of FIG. 3, the entire electrical circuitry is shown, although the present invention is primarily confined to the particular configuration for the temperature sensing and testing circuit 54. The remaining portions of the circuit diagram of the heat detector 50 are conventional and readily understood to those skilled in the art. Thus, a detailed explanation of the remaining portions of the heat detector circuit other than the temperature sensing and testing circuit 54 will be omitted.

As can be seen in FIG. 3, the temperature sensing and testing circuit 54 is connected to a detector input terminal 55 of the control unit 52 of the heat detector 50. Like the prior art heat detector described in FIGS. 1 and 2, the control unit 52 also includes a reference terminal 53 that is generally held at approximately 50% of the voltage source 16 (Vdd) via internal structures within control unit 52.

As can be seen in FIG. 3, the temperature sensing and testing circuit 54 includes thermistor 56 connected between node 58 and ground. Node 58, in turn, is connected to the detector input terminal 55 for the control unit 52 by a resistor 60. The resistor 60 has a nominal value of 10 MΩ, such that the resistor 60 has little to no impact on the value of the detector voltage applied to the input terminal 55. Like the prior art temperature sensing and testing circuit 10 illustrated in FIG. 1, a supply resistance 62 is connected to node 58 such that the supply resistance 62 forms part of the upper leg of a voltage divider and the thermistor 56 forms the lower leg of the voltage divider. The thermistor 56 is an NTC device having generally the same operating characteristics as the thermistor 14 shown in the prior art, whose temperature-based resistance values are illustrated in Table 1. Thus, as the temperature increases, the value of the thermistor 56 decreases such that the detector voltage at node 58 also decreases. Once the detector voltage at node 58 falls below the reference voltage at reference terminal 53, the control unit 52 generates a heat alarm signal. Thus, the general operating function of the temperature sensing and testing circuit 54 is similar to the prior art temperature sensing and testing circuit 10 illustrated in FIG. 1 and previously described.

Figure 4:
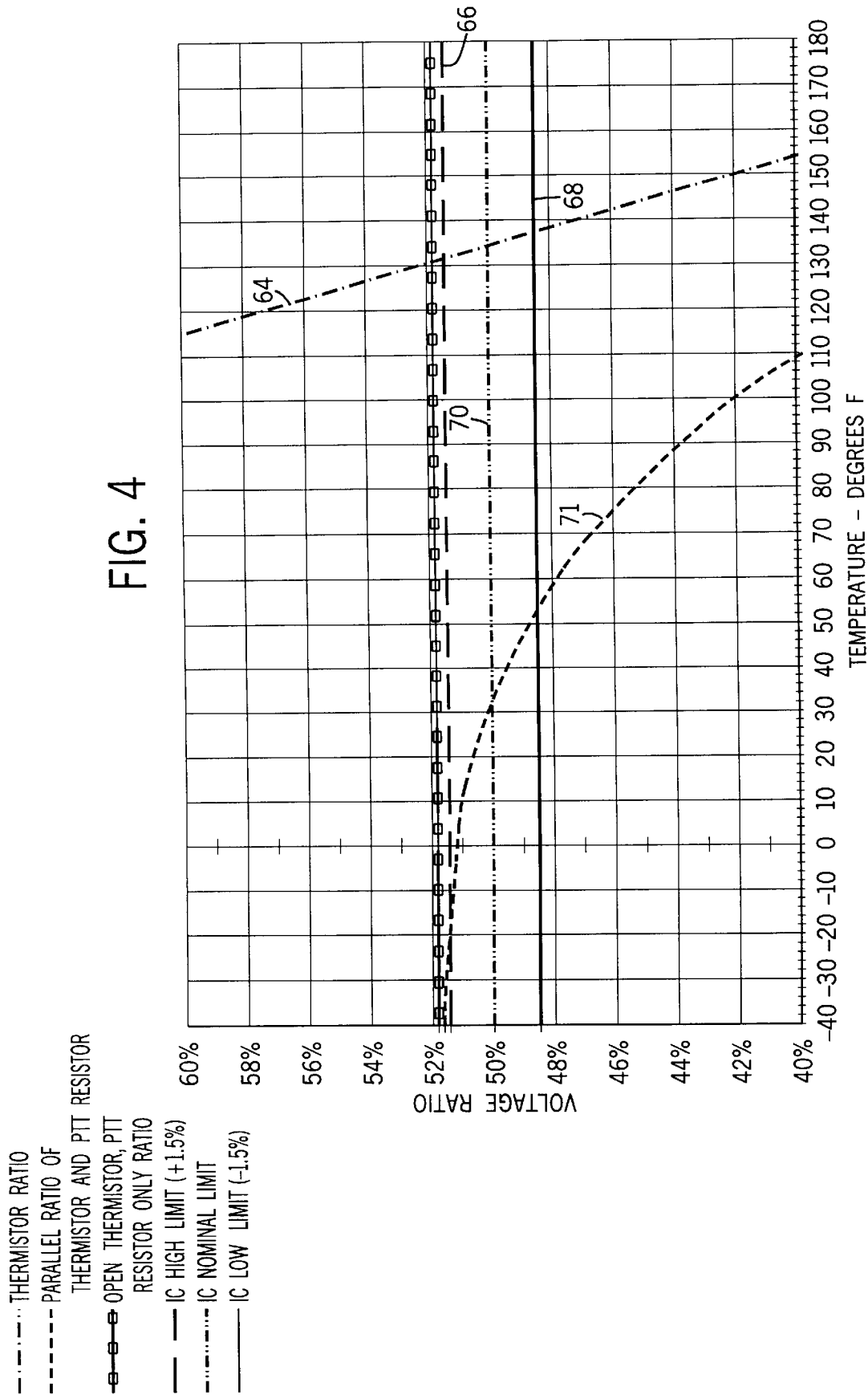
FIG. 4 is a graph illustrating the response characteristics of the preferred embodiment of the invention showing the response as a result of the elimination of a series resistance connected to the temperature sensing thermistor.

As can be understood in FIG. 3, the series resistance 20 that is present in the prior art circuit of FIG. 1 has been eliminated such that the thermistor 56 is now connected directly between the voltage input node 58 and ground. The elimination of the series resistance 20 greatly increases the slope of the thermistor ratio line 64 in FIG. 4. The slope of the ratio line 64 is greatly increased since the resistance of the lower leg of the voltage divider directly depends solely on the resistance of the thermistor 56 and does not include any series resistance. As can be seen in FIG. 4, the thermistor ratio line 64 crosses the control unit high limit 66 at approximately 131° F. and crosses the control unit low limit 68 at approximately 136° F., while the crossing of the control unit nominal limit 70 remains at the designed temperature of 135° F. As can be easily shown in FIG. 4, the elimination of the series resistance 20 and the direct connection of the thermistor 56 to ground increases the nominal accuracy of the heat detector for a given range of tolerances present in the control unit 52.

As discussed previously, the elimination of the series resistance 20 subjects the entire temperature sensing and testing circuit 54 to the several magnitudes of change in the value of the thermistor 56 over the temperature range illustrated in Table 1. The several magnitudes of change in the thermistor 56 resulted in a testing circuit that could not be used below a relatively moderate temperature. In FIG. 4, the elimination of the series resistance 20 in the prior art testing circuit of FIG. 1, when resistors 18 and 42 are adjusted for proper temperature sensing and push-to-test functionality, results in a parallel ratio of the thermistor 56 and the test resistance 42, as illustrated by line 71. The parallel ratio illustrated by line 71 crosses the lower limit 68 for the control unit 52 at approximately +53° F. (12° C.), and crosses the nominal limit 70 at approximately +30° F. (−1° C.). Thus, by simply eliminating the series resistance 20 shown in FIG. 1, the heat detector could not be reliably tested at ambient temperatures below +53° F. (12° C.). Since this relatively high temperature was unacceptable, the prior art systems inserted the series resistance 20 to allow the heat detector to be adequately tested.

Referring back to FIG. 3, the temperature sensing and testing circuit 54 of the present invention includes a parallel combination of a transistor 70 and a test resistance 72 connected between the supply resistance 62 and the voltage source 16. Specifically, the emitter of the transistor 70 is connected to the voltage source 16, while the collector of the transistor 70 is connected to the supply resistance 62. The base of transistor 70 is connected to ground through a bias resistance 74. A push button, normally open switch 76, is positioned to connect the base of the transistor 70 to the emitter of the transistor when the push button 76 is depressed (electrically closed) by the user, such as when the user desires to enable the push-to-test feature of the heat alarm.

The operation of the testing portion of the temperature sensing and testing circuit 54 will now be described. During normal standby conditions when the push button 76 is open, the transistor 70 is turned on and saturated since a base current is being provided to the base of the transistor 76 by the bias resistance 74. In the preferred embodiment of the invention, the bias resistance 74 is a 1.5 MΩ resistor. When the transistor 70 is saturated and turned on, the voltage at the collector is a few tens of millivolts less than the emitter such that the transistor provides essentially a direct connection from the supply resistance 62 to the voltage source 16. Therefore, under normal operating conditions, the supply resistance 62 is essentially directly connected to the voltage source 16 and forms the upper leg of the voltage divider circuit, while the thermistor 56 forms the lower leg of the voltage divider. As discussed with reference to FIG. 4, the voltage divider including only the supply resistance 62 and the thermistor 56 provides the highest rate-of-change of the detector voltage at node 58 possible with a thermistor 56 that is exposed to varying temperatures, and thus achieves the highest accuracy possible for the device.

Figure 5:
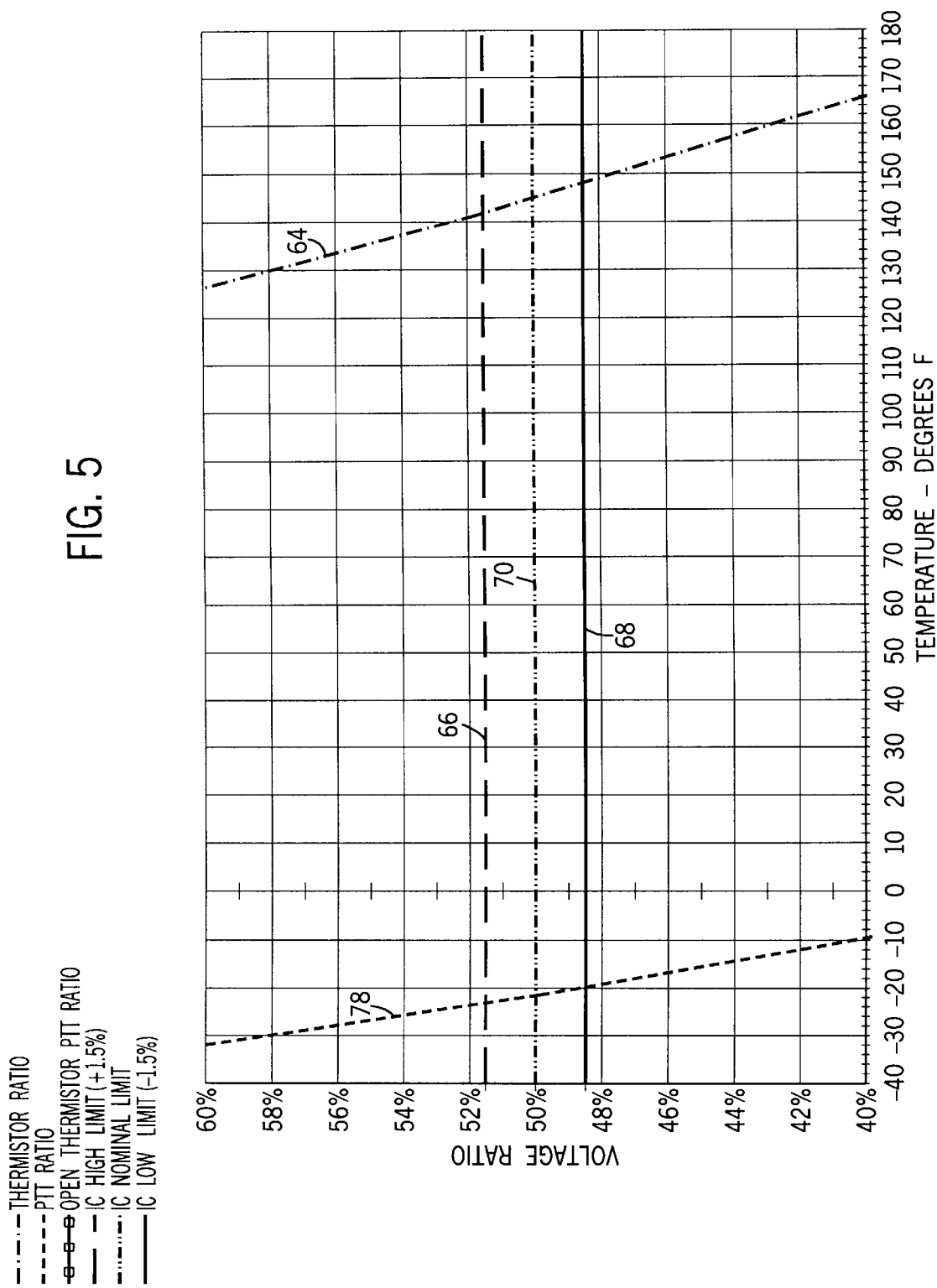
FIG. 5 is a graph of the response of the heat detecting circuit of FIG. 3 illustrating the effect of the improved push-to-test circuit on the minimum testing temperature.

When the push button 76 is depressed, the base of the transistor 70 is connected directly to the emitter, thereby bypassing the effect of the bias resistance 74. With the bias resistance 74 bypassed, the transistor 70 is starved of base current and now provides an extremely high impedance between the transistor emitter and collector. As a result, the test resistance 72 appears in the upper leg of the voltage divider and is connected in series between the supply resistance 62 and the voltage source 16. The insertion of the test resistance 72 in the upper leg of the voltage divider provides an effective test means for the heat alarm circuitry and is illustrated by the push-to-test voltage ratio line 78 in FIG. 5. As can be seen in FIG. 5, the push-to-test voltage ratio line 78 crosses the IC nominal limit 70 at approximately −22° F. (−30° C.) with fairly small variation due to the control unit's tolerance, which is a vast improvement over the same crossing of the push-to-test voltage ratio line 71 in FIG. 4.

In the preferred embodiment of the invention illustrated in FIG. 3, the control unit 52 compares the detector voltage at node 58 to the reference voltage and generates an alarm when the detector voltage falls below the reference voltage. It is contemplated by the inventors that the upper and lower legs of the voltage divider could be inverted and the control unit 52 configured to generate an alarm when the detector voltage exceeds the reference voltage. For example, the upper leg of the voltage divider could be configured to include the thermistor 56 connected between node 58 and the voltage source 16, while the transistor 70 and test resistance 72 would be connected between the node 58 and ground. Clearly, the alternate embodiment described above is a matter of mere design choice and does not affect the overall operation of the system of the present invention.

In addition to the alternate embodiment discussed above, it is contemplated by the inventor that a normally closed switch could replace the transistor 70 and bias resistance 74 in the temperature sensing and testing circuit 54. The normally closed switch could be placed in parallel with the test resistance 72 between the supply resistance 62 and the voltage source 16. When the normally closed switch is closed, the supply resistance 62 would be connected directly to the voltage source 16, in the same manner as discussed above when the transistor 70 is turned on and saturated. If the normally closed switch were opened (for example, when the user desired to enable the push-to-test feature of the heat alarm), the switch would create an open circuit between the voltage source 16 and the supply resistance 62. As was the case when the transistor 70 is turned off, the test resistance 72 would then appear in the upper leg of the voltage divider and be connected in series between the supply resistance 62 and voltage source 16. The inclusion of a normally closed switch to replace the transistor is a matter of design choice and does not affect the overall operation of the system of the present invention.

The parallel combination of the test resistance 72 and transistor 70 also functions well if the thermistor 56 has been damaged and acts as an open circuit. As can be understood in FIG. 3, if the thermistor 56 fails and acts as an open circuit, the voltage supplied to the input node 58 will be approximately equal to the voltage source 16. Thus, if the thermistor 56 is an open circuit, the voltage at the detector input terminal 55 will greatly exceed the voltage at the reference terminal 53 and prevent the heat detector from generating an alarm. In FIG. 5, the open thermistor push-to-test ratio is off of the scale of the graph and thus not shown. Thus, when the user depresses the push button 76, the heat detector will fail to generate an alarm if the thermistor 56 has been damaged, which will indicate to the user a problem exists in the heat detector 52.

As can be understood in FIG. 5, the elimination of the resistance in series with the thermistor 56 also has the added benefit of significantly increasing the slope of the push-to-test voltage ratio line 78. As can be seen in FIG. 5, the range of operation for the temperature sensing and test circuit 54, due to the tolerance of the control unit 52, is between approximately −24° F. (−31° C.) to −19° F. (−28° C.). This is a substantial improvement over the prior art circuit shown in FIG. 2 and an even more dramatic improvement over the graph of FIG. 4 in which the test resistor was switched in parallel with the thermistor (or a combination of a thermistor and a series resistor) as taught by the prior art.

In the prior art temperature sensing and test circuit 10 illustrated in FIG. 1, the thermistor 14 is mechanically protected by a cage molded as part of the plastic housing for the heat detector. The cage surrounding the thermistor is designed to be mechanically firm, yet have enough open space to allow an easy flow of air currents necessary to allow the resistance of the thermistor to change in a timely manner. In the prior art systems, the series resistance 20 is connected in series with the thermistor 14. In addition to being connected to the series resistance 20, the thermistor 14 is also connected to the supply resistance 18 and the resistor 30 connected to the sensing input of the control unit. In the event of a total failure of the mechanical plastic cage of the heat alarm, a person may be physically able to touch the leads of the thermistor. If the heat alarm is correctly installed, the act of touching the thermistor would be non-hazardous and inconsequential, as there is a minimum potential between the thermistor element and earth ground.

In the temperature sensing and testing circuit 54 of the present invention, the thermistor 56 is directly connected between ground and the input node 58. Thus, there is no longer the series resistance 20 to aid in isolating the voltage across the thermistor 56. In order to proactively isolate the thermistor 56 from any inadvertent contact with the user, an insulating medium is used to provide dielectric isolation between the thermistor and the user. This medium requires the characteristics of a high-quality and reliable dielectric, yet possessing characteristics that assure reliable and repeatable heat transfer from the environment to the thermistor.

In the present invention, the thermistor 56 is surrounded with heat shrink tubing, such as tubing manufactured with Kynar™ material, that provides dielectric isolation between the thermistor leads and body. Kynar™ material was chosen because of its excellent thermal conductivity, which allows the heat alarm's thermistor to respond rapidly to changes in the environment. Secondly, Kynar™ has the ability to easily withstand rapid and frequent changes from low to high temperatures, as might be found in residential applications such as attics, without degradation of the polymeric material and subsequent loss of dielectric characteristics. With the heat shrink tubing in place, it is impossible to touch any exposed metallic part of the thermistor 56, even if the cage is damaged or bypassed.

During testing of the heat detector of the present invention, the inclusion of the Kynar™ heat shrink sleeving over the thermistor 56 reduces the temperature sensitivity of the unit by only a small, but measurable amount. As a result, the static temperature trip point of the heat detector can be modified to compensate for the loss in sensitivity of the thermistor 56 due to changes in the temperature.

Various alternatives and embodiments are contemplated as being within the scope of the following claims particularly pointing out and distinctly claiming the subject matter regarded as the invention.

We claim:

1. A heat detector comprising:
   a control unit for comparing a detector voltage to a reference voltage and generating an alarm signal based on the magnitude of the detector voltage relative to the magnitude of the reference voltage, the control unit including a detector input terminal that receives the detector voltage;
   a temperature sensing component coupled to the detector input terminal, the resistance of the temperature sensing component being responsive to changes in temperature;
   a supply resistance coupled to the detector input terminal to form an upper leg of a voltage divider, a bottom leg of the voltage divider including the temperature sensing component, wherein the voltage divider generates the detector voltage and the detector voltage varies based upon the resistance of the temperature sensing component; and
   a testing circuit positioned in the upper leg of the voltage divider between the supply resistance and a voltage source, the testing circuit being operable to modify the detector voltage to simulate a change in temperature to test the heat detector.

2. The heat detector of claim 1 wherein the testing circuit comprises:
   a transistor connected between the supply resistance and the voltage source, wherein the transistor is saturated during normal operating conditions to form an essentially short circuit between the supply resistance and the voltage source;
   a test resistance connected in parallel with the transistor between the supply resistance and the voltage source; and
   a push button depressible to simulate a change in temperature to test the heat detector, wherein when the push button is depressed, the transistor is turned off and forms an essentially open circuit between the supply resistance and the voltage source such that the upper leg of the voltage divider includes the series combination of the test resistance and the supply resistance.

3. The heat detector of claim 2 further comprising a bias resistance connected between the transistor and ground, wherein the bias resistance saturates the transistor during normal operating conditions.

4. The heat detector of claim 3 wherein the push button is connected between the base and the emitter of the transistor such that when the push button is depressed, the base and emitter of the transistor are connected such that the transistor is turned off.

5. The heat detector of claim 1 wherein the temperature sensing component is a negative temperature coefficient thermistor such that as the temperature increases, the resistance of the thermistor and the detector voltage decrease.

6. The heat detector of claim 5 wherein the thermistor is connected directly to ground and directly to the supply resistance.

7. The heat detector of claim 5 wherein the reference voltage is approximately 50% of the voltage source.

8. The heat detector of claim 1 wherein the temperature sensing component is a thermistor coated with a layer of insulation.

9. The heat detector of claim 7 wherein the layer of insulation is heat shrunk tubing formed from Kynar™.

10. The heat detector of claim 2 wherein the value of the test resistance is selected such that when the push button is depressed, the upper leg of the voltage divider including the series combination of the test resistance and the supply resistance is greater than the resistance of the lower leg of the voltage divider including the temperature sensing component when the temperature is above a preselected lower limit.

11. The heat detector of claim 10 wherein the preselected lower limit is approximately −20° F. (−29° C.).

12. In a heat detector having a control unit for comparing a reference voltage to a temperature detector voltage generated by a voltage divider formed by an upper leg including a supply resistance and a lower leg including a temperature sensing component whose resistance is responsive to temperature changes, the improvement comprising:
   a testing circuit positioned in the upper leg of the voltage divider between the supply resistance and a voltage source, the testing circuit being operable to simulate a change in temperature, the testing circuit comprising:
      a transistor connected between the supply resistance and the voltage source, wherein the transistor is saturated during normal operating conditions to form an essentially short circuit between the supply resistance and the voltage source;
      a test resistance connected in parallel with the transistor between the supply resistance and the voltage source; and
      a push button depressible to simulate a change in temperature, wherein when the push button is depressed, the transistor is turned off and forms an essentially open circuit between the supply resistance and the voltage source such that the upper leg of the voltage divider includes the series combination of the test resistance and the supply resistance.

13. The improvement of claim 12 further comprising a bias resistance connected between the transistor and ground to saturate the transistor during normal operating conditions.

14. The improvement of claim 13 wherein the push button is connected between the base and the emitter of the transistor such that when the push button is depressed, the base and emitter of the transistor are connected such that the transistor is turned off.

15. The improvement of claim 12 wherein the value of the test resistance is selected such that when the push button is depressed, the resistance of the upper leg of the voltage divider including the series combination of the test resistance and the supply resistance is greater than the resistance of the lower leg of the voltage divider including the temperature sensing component when the temperature is above a preselected lower limit.

16. The improvement of claim 15 wherein the preselected lower limit is approximately −20° F. (−29° C.).

17. A heat detector comprising:
   a control unit for comparing a reference voltage to a detector voltage generated by a voltage divider including an upper leg and a lower leg, the control unit generating an alarm signal based on the magnitude of the reference voltage relative to the magnitude of the detector voltage, the control unit including a detector input that receives the detector voltage;
   a thermistor coupled to the detector input to form the lower leg of the voltage divider, the resistance of the thermistor being responsive to changes in temperature;
   a supply resistance coupled to the detector input terminal to form a portion of the upper leg of the voltage divider;
   a transistor connected between the supply resistance and a voltage source, wherein the transistor is saturated during normal operating conditions to form an essentially short circuit between the supply resistor and the voltage source such that the upper leg of the voltage divider includes only the supply resistance;
   a test resistance connected in parallel with the transistor between the supply resistance and the voltage source; and
   a push button depressible to simulate a change in temperature, wherein when the push button is depressed, the transistor is turned off and forms an essentially open circuit between the supply resistance and the voltage source such that the upper leg of the voltage divider includes the series combination of the test resistance and the supply resistance.

18. The heat detector of claim 17 wherein the thermistor is a negative temperature coefficient device such that as the temperature in the desired location increases, the resistance of the thermistor decreases such that the detector voltage also decreases.

19. The heat detector of claim 17 wherein the thermistor is coated with a layer of insulation.

20. The heat detector of claim 19 wherein the layer of insulation is heat shrink tubing formed from Kynar™.

21. The heat detector of claim 17 wherein the value of the test resistance is selected such that when the push button is depressed, the resistance of the upper leg of the voltage divider including the series combination of the test resistance and the supply resistance is greater than the resistance of the lower leg of the voltage divider including the thermistor when the temperature is above a preselected lower limit.

22. The heat detector of claim 21 wherein the preselected lower limit is approximately −20° F. (−29° C.).

23. The heat detector of claim 17 further comprising a bias resistance connected between the base of the transistor and ground to saturate the transistor during normal operating conditions.

24. The heat detector of claim 23 wherein the push button is connected between the base and the emitter of the transistor such that when the push button is depressed, the base and emitter of the transistor are connected to turn off the transistor.

* * * * *